United States Patent
Foley et al.

(10) Patent No.: US 8,380,926 B1
(45) Date of Patent: Feb. 19, 2013

(54) HANDLING SECTOR EDGES

(75) Inventors: Robert P. Foley, Clinton, MA (US);
Ronald D. Proulx, Boxborough, MA (US); Adi Ofer, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 279 days.

(21) Appl. No.: 12/751,783

(22) Filed: Mar. 31, 2010

(51) Int. Cl.
*G06F 12/00* (2006.01)

(52) U.S. Cl. .................. 711/114; 711/E12.078

(58) Field of Classification Search .......... None
See application file for complete search history.

(56) References Cited

U.S. PATENT DOCUMENTS

| | | | | |
|---|---|---|---|---|
| 2006/0224823 | A1* | 10/2006 | Morley et al. | 711/113 |
| 2008/0005467 | A1* | 1/2008 | Morley et al. | 711/113 |
| 2008/0235461 | A1* | 9/2008 | Tan et al. | 711/146 |

* cited by examiner

*Primary Examiner* — Edward Dudek, Jr.
*Assistant Examiner* — Sean D Rossiter
(74) *Attorney, Agent, or Firm* — Krishnendu Gupta; Jason A. Reyes

(57) ABSTRACT

A method is used in handling sector edges. Input/output (I/O) requests to a storage device are handled. The I/O requests use a different sector size format than that of the storage device. An I/O request is received for a write operation at a logical address of a virtual device. The write operation specifies new data to be written to the virtual device. A logical sector associated with the logical address is determined. The logical sector is mapped to a portion of a physical sector of the storage device. The sector edge of the physical sector is read into a RAID-protected memory. The read sector edge is written together with the new data to the storage device.

8 Claims, 8 Drawing Sheets

HANDLING SECTOR EDGES

FIELD OF THE INVENTION

The invention relates to handling sector edges.

BACKGROUND

Low cost has made ATA (Advanced Technology Attachment) disk drives a popular choice for data storage in various data processing systems. The development of the Serial ATA (SATA) protocol has furthered this popularity by providing features such as hot-pluggability, flexible cabling, and CRC (cyclic redundancy check) for all data, command, and status communications. In addition, the storage density of ATA disk drives makes them particularly advantageous for large-capacity storage systems. Accordingly, Redundant Array of Independent Disks (RAID) implementations, which have traditionally employed SCSI or Fibre Channel disk drive technologies, are currently adopting the use of ATA disk drives.

Current ATA disk drives, however, only support a standard-sized sector format of 512 bytes, whereas applications or other software that interact with the disk drives, such as a RAID implementation, can require sectors of a different size. A sector is the smallest unit for which an access can be made to the disk. The difference in sector size requires address translation between the addresses and sectors specified by an application, referred to as logical addresses and logical sectors, and the physical addresses and physical sectors of the disk drive. This sector-size difference also produces a misalignment between logical and physical sectors of the disk drives. For example, if a logical sector is larger (in bytes) than a physical sector, then the logical sector overlaps multiple physical sectors. Consequently, a write operation to a logical sector is, in effect, a write operation to multiple physical sectors, although portions of one or of all of these physical sectors are not being written to. These portions are located at the edges of the overlap between the logical sector and the physical sectors; such edges are referred to as sector edges. This write operation can require an additional read I/O operation to obtain data from the sector edges. Additional read I/O operations of sector edges thus have performance implications for applications that perform small write or large misaligned write operations.

U.S. Pat. No. 7,277,986 issued to Morley, et al. on Oct. 2, 2007 entitled "Sector-edge cache" describes a sector-edge cache that stores sector edges obtained from sectors during previously executed read and write operations.

SUMMARY

A method is used in handling sector edges. Input/output (I/O) requests to a storage device are handled. The I/O requests use a different sector size format than that of the storage device. An I/O request is received for a write operation at a logical address of a virtual device. The write operation specifies new data to be written to the virtual device. A logical sector associated with the logical address is determined. The logical sector is mapped to a portion of a physical sector of the storage device. The sector edge of the physical sector is read into a RAID-protected memory. The read sector edge is written together with the new data to the storage device.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
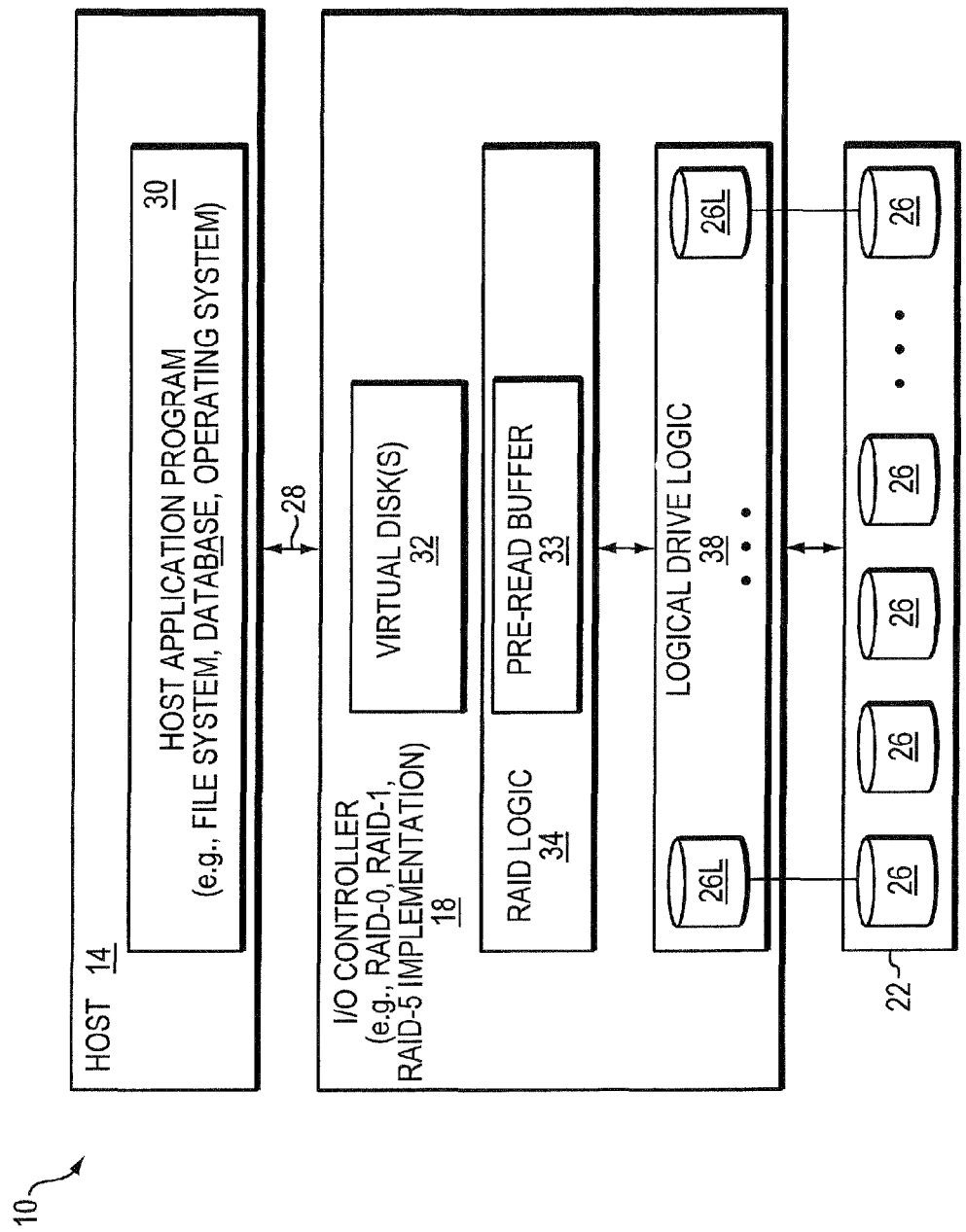
FIG. 1 is a diagram of an embodiment of a data processing system constructed in accordance with the invention, the data processing system including a host, an I/O controller, and an array of disks.

Described below is a technique for use in handling sector edges, which technique may be used to provide, among other things, enhanced block virtualization I/O operations particularly for performing reads and writes to a drive where the logical block size does not match the physical block size of the drive (low level format or "LLF"). In the case of such a drive, one physical block (also referred to herein as "sector") contains portions of data from different logical blocks, reads fetch the partial physical blocks, and writes update partial physical blocks. In at least one implementation of the technique, a read operation uses a bitbucket to buffer portions of physical blocks that are not needed, and an unaligned write operation requires a pre-read, with the consistency of the pre-read being checked at RAID level before the write is issued to a different level that combines the RAID level pre-read with new write data.

In one conventional approach, a special driver creates a special level, below RAID level, which does all block virtualization and edge caching. Such special level completely isolates the RAID level from knowledge of the LLF of the drive. (Edge caching is defined as caching the extra bytes of physical blocks that are needed to update a set of logical blocks.) Conventionally the special driver performs pre-reads automatically for writes that are not aligned to the low level format of the drive, and the special level also saves the edge pieces of blocks from reads in one edge cache per disk so that a later write operation is able to take advantage of this pre-read data in performing a write.

By contrast, by use of the technique described herein, a system can be more memory efficient since it is not caching sector edges. Such system can be more robust from a data integrity standpoint since the RAID level is checking the pre-read data on writes to validate the partial logical blocks (the edges) that are written, and the RAID level has knowledge of the drive's block size and can fix errors found in pre-reads.

In at least one example implementation, the technique features a specific system and method for use in avoiding or mitigating corruption risk and memory inefficiency associated with pre-reading sector edges from disk, as described herein. Sector edges result when software of a data processing system interacts with physical storage using a differently sized sector format than that of the physical storage. The software issues read and write requests addressed to logical sectors, which are mapped to physical sectors of storage disks. Aligned write operations to groups of sectors, called segments, can avert needing to pre-read sector edges; however, small (i.e., smaller in size than one segment) or misaligned write operations require a pre-reading of sector edges so that the pre-read sector edges can be combined with the new data to be written. The combination is then written to disk. Use of RAID-level pre-reading of the present technique helps avoid data corruption and memory inefficiencies. A write operation to a logical block uses a pre-read sector edge stored in a RAID-protected pre-read buffer, thus helping to avoid data corruption problems that can occur below the RAID level. In addition, no additional pre-reads are necessary when combining sector edges with new data during the write phase of the process. The read phase of the read-modify-write process thus absorbs the performance penalty associated with mapping logical sectors to physical sectors.

FIG. 1 shows an embodiment of a data processing system 10 constructed in accordance with the technique. The data processing system 10 includes a host system 14, an I/O controller 18, and an array 22 of disks 26. In general, the host system 14 is a processor-based system with persistent storage for storing data and software programs, such as a host application program 30. Examples of host application programs include, but are not limited to, databases, operating systems, and file systems.

The host system 14 is in communication with the I/O controller 18 over a host storage interconnect 28 (e.g., a Fibre Channel bus, SCSI bus). The I/O controller 18 implements an I/O subsystem (e.g., a RAID-0, RAID-1, RAID-5 implementation) for controlling access to the disks 26 in response to read and write I/O operations initiated by the host application program 30. Through the I/O controller 18, this host application program 30 interacts with the disks 26 of the disk array 22, which the I/O controller 18 presents to the host application program 30 as one or more virtual disks 32. In addition, the host application program 30 issues I/O requests to the virtual disks 32 and the I/O controller 18 transforms these I/O requests into I/O requests to the physical disks 26 within the disk array 22.

Each disk 26 in the disk array 22 has a plurality of sectors, referred to herein as physical sectors. The physical sectors have a uniform size in bytes. In accordance with the technique, the sectors referenced in I/O requests issued by the I/O controller 18, hereafter referred to as logical sectors, have a different size than that of the physical sectors on the disks 26. (In general, the size difference may be attributable to the use of additional information (e.g., metadata) by the I/O controller in order to implement the functionality of a particular I/O subsystem).

RAID logic 34 provides RAID protection (e.g., RAID-5 as described below) in I/O controller 18 and also can determine whether one or more extra logical sectors need to be read for write and read operations as described below. Logic 34 provides a RAID layer which performs the RAID algorithms (either parity (RAID-5, RAID-3, or RAID-6), mirroring (RAID-1 or RAID-10) or striping (RAID-0 and individual disks)).

Logical drive logic 38 has logical drives 26L and can map logical sectors referenced by the I/O controller 18 into physical sectors of the disks 26. Each logical drive 26L provides a block conversion layer on a per drive basis that converts between the logical block size and the physical block size.

In a preferred embodiment, the data processing system 10 is a networked storage system in which the I/O controller 18 operates as a storage processor, having a Fibre Channel front end and a Serial ATA back end (i.e., disks 26 are ATA disk drives), and provides a RAID-5 implementation. The RAID-5 implementation performs a parity calculation on data written to disk. This parity calculation occurs in real time and is part of the typical read-modify-write process of RAID-5. The written data and parity data are "striped" across the disks 26 in the disk array 22; corresponding sectors on the disks 26 define a stripe. If one disk 26 in the disk array fails, RAID-5 recreates the lost data on the failing disk from the parity data and data blocks on the remaining disks.

For each write request, the RAID-5 system performs multiple I/O operations as part of the read-modify-write process. One I/O operation reads in the data blocks of a stripe to be updated with new data, and another reads the parity block associated with the data blocks.

In accordance with the principles of the technique, the read I/O operation also causes, if necessary, the sector edges associated with the data and parity blocks to be read into pre-read buffer 33. Then, the parity is modified to reflect the new data. Subsequently, another I/O operation writes the updated parity to the parity block and the new data to the data blocks.

Also, in the preferred embodiment, ATA disk drives have 512-byte physical sectors and the RAID-5 implementation employs 520-byte sectors. Principles of the technique also apply, however, when the logical sectors have fewer bytes than the physical sectors, as described further below. It is to be understood that this preferred embodiment is but one example of the various system configurations in which the technique may be practiced. For example, other levels of RAID, such as RAID-0 and RAID-1, can practice the technique, although not as beneficially as a RAID-5 implementation, because RAID-0 and RAID-1 do not perform read-modify-write processes like RAID-5. Further, when issuing I/O requests to the virtual disks 32, as presented by the I/O controller 18, different embodiments of the host application program 30 can use sectors (which can also be considered logical sectors) having a sector size format that is the same as or differs from that of the physical disks 26.

Figure 2:
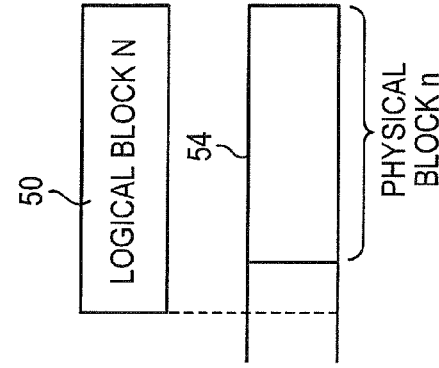
FIGS. 2-4 are diagrams illustrating an exemplary partial mapping of logical sectors to physical sectors, wherein logical sectors are each larger in bytes than physical sectors and the mapping of each logical sector produces a leading sector edge, a trailing sector edge, or both within each physical sector to which that logical sector maps.
Figure 2:
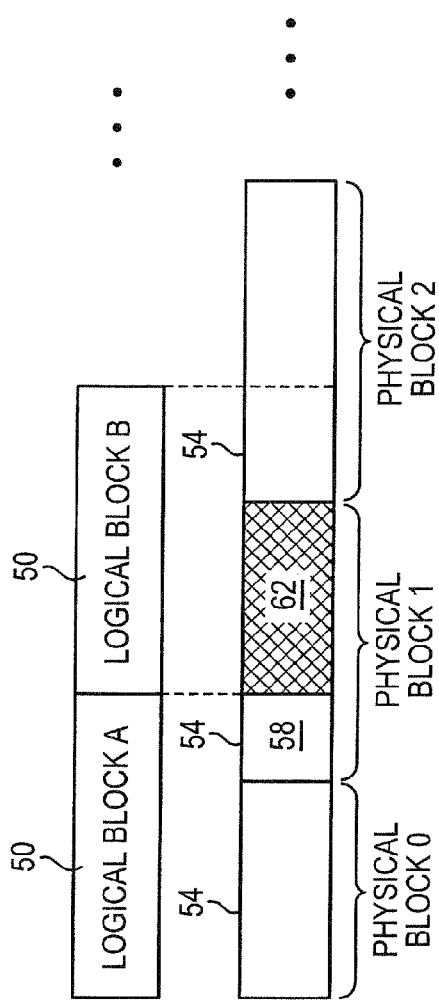

FIG. 2 illustrates part of an exemplary mapping in which logical sectors 50 are greater in length than the physical sectors 54. In this example, the logical sectors are each 520 bytes in length and the physical sectors are 512 bytes in length. A general algorithm for mapping 520-byte logical sectors to 512-byte physical sectors, provided there are no discontinuities in the mapping or unused addresses, is as follows:

$LBA_{512} = (LBA_{520}*520)/512$—this is integer math that discards the remainder.

$OFFSET_{512} = (LBA_{520}*520)\%512$—this is a modulo function.

where $LBA_{512}$ is the physical sector that contains the start of the data corresponding to the logical sector $LBA_{520}$, and where $OFFSET_{512}$ represents the byte offset within physical sector $LBA_{512}$ that contains the first byte of logical sector $LBA_{520}$. The form (Sector, Offset) represents the address of the 520-byte sector data in the 512-byte sector address space. To read all of the data for sector $LBA_{520}$ requires reading the data from physical address ($LBA_{512}$, $OFFSET_{512}$) through physical address ($LBA_{512}+1$, ($OFFSET_{512}+520-1$)%512). This algorithm applies to single sectors (i.e., not to multiple sector requests).

As shown, the logical sectors 50 includes data blocks labeled block A, block B, and block N; the physical sectors 54 include data blocks labeled block 0, block 1, block 2, and block n. Indicated by ellipses, but not shown, are the other intermediate logical and physical sectors. Hereafter, the data blocks of logical sectors 50 are also called logical blocks and those of physical sectors 54, physical blocks. As an illustrative example, logical block A maps to the entirety of physical block 0 and to a leading portion 58 of physical block 1. The portion 62 of physical block 1 to which the logical block A does not map is referred to as a trailing sector edge because this unmapped portion 62 trails (i.e., follows in address) the mapped leading portion 58. Accordingly, logical block A has an associated trailing sector edge, but no associated leading sector edge.

Figure 3:
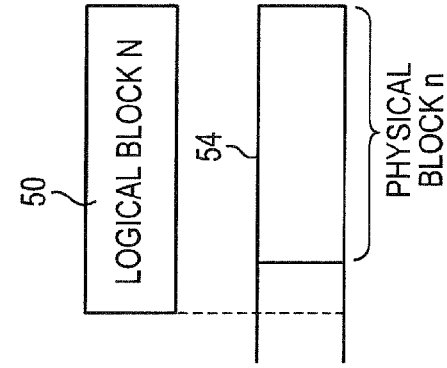
Figure 3:
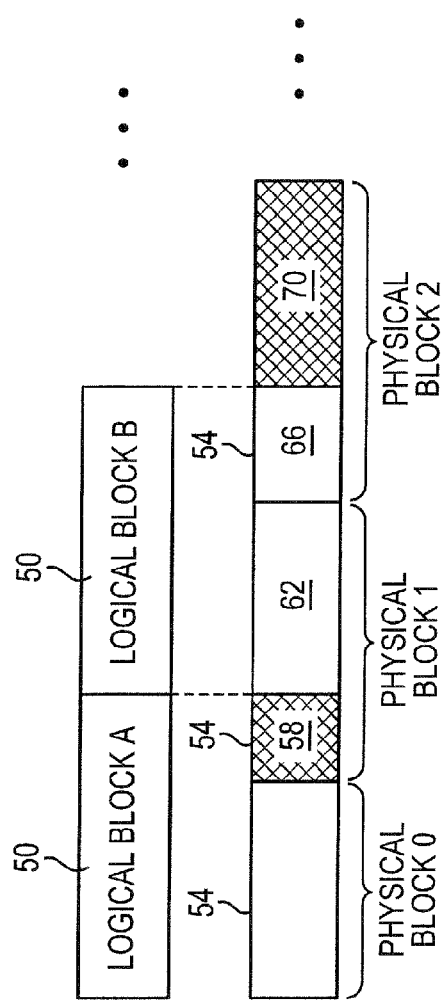

FIG. 3 shows the exemplary mapping of FIG. 2 with particular reference to the logical block B. Block B maps to the portion 62 of physical block 1 and to a leading portion 66 of physical block 2. Accordingly, portion 62 of physical block 1 corresponds to a trailing sector edge with respect to logical block A (FIG. 2) and sector data with respect to logical block B. Here, the leading portion 58 of physical block 1 is a leading sector edge and a trailing portion 70 of physical block 2 is a trailing sector edge. Accordingly, the portion 58 of physical block 1 corresponds to sector data with respect to logical block A and a leading sector edge with respect to logical block B. A write operation directed to logical block A can change the data content of portion 58 of physical block 1. Similarly, a write operation directed to logical block B can change the data content of portion 62 of physical block 1.

Figure 4:
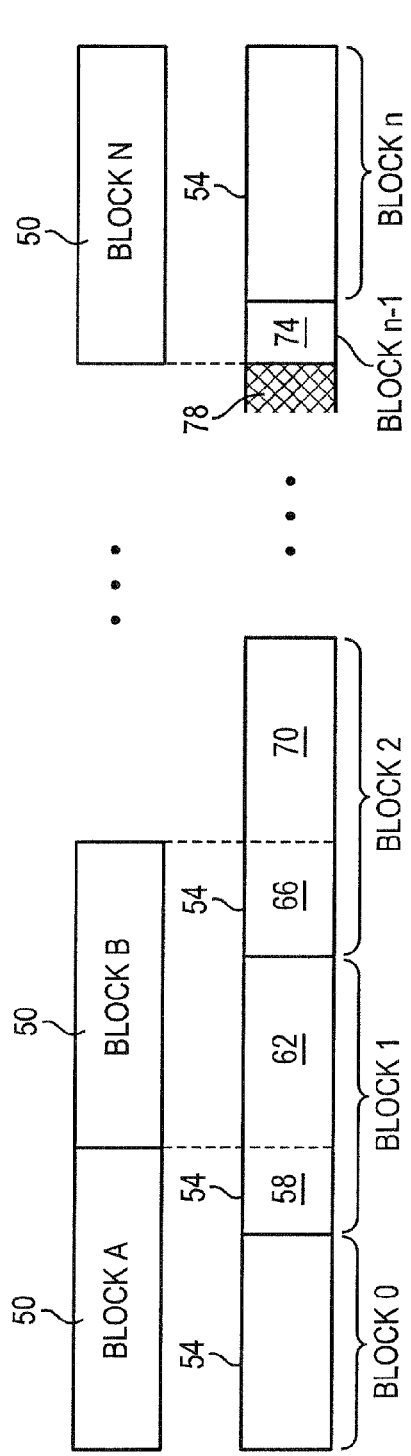

FIG. 4 shows again the exemplary mapping of FIG. 2, here with particular reference to the mapping of logical block N to physical sectors n and n−1. Block N maps to a trailing portion 74 of physical block n−1 and to the entirety of block n. Block N does not map to a leading portion 78 of physical block n−1. Accordingly, this particular logical-to-physical sector mapping produces a leading sector edge, but no trailing sector edge. Using 520-byte logical sectors and 512-byte physical sectors, for example, a last-address alignment between a logical sector and a physical sector occurs at every $64^{th}$ logical sector and every $65^{th}$ physical sector.

I/O access of uniformly sized segments that achieve a last-address alignment between a logical sector and a physical sector, e.g., a segment comprised of 64 520-byte logical sectors mapped to 65 512-byte physical sectors, have an advantage of not needing to pre-read sector edges during an aligned write operation to a segment. Another advantage is that such segment sizes fully utilize the storage capacity of the disk 26, in comparison with other segment sizes as described in Table 1 below.

Figure 5:
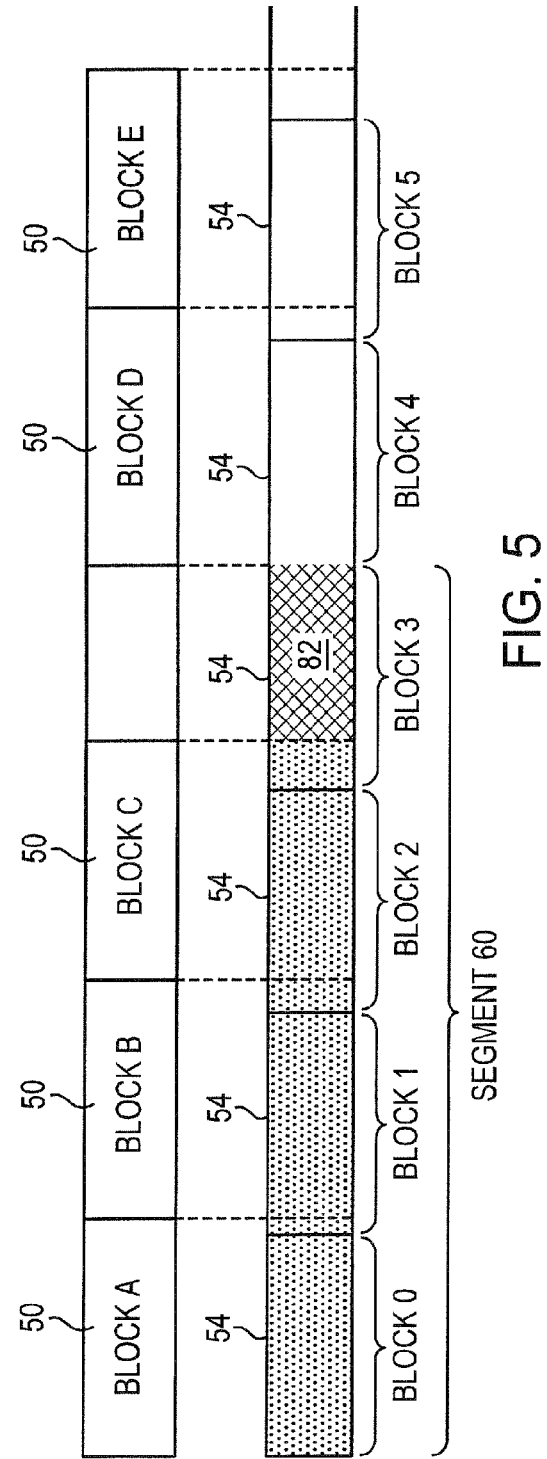
FIG. 5 is a diagram illustrating an exemplary partial mapping of logical sectors to physical sectors adapted for aligned I/O operations using uniformly sized segments each comprised of a predetermined number of sectors.

FIG. 5 shows an example in which the definition of a segment comprises four physical sectors. As shown, one segment 60 (shaded) has four physical data blocks labeled block 0, block 1, block 2, and block 3. In this example, each block is a 512-byte physical block. Block 4 and every fourth physical block thereafter is the start of a new segment.

Also shown is an exemplary mapping of 520-byte logical blocks to the 512-byte physical blocks. Three logical blocks, comprised of block A, block B, and block C, map to the four physical blocks: block 0, block 1, block 2, and block 3. The mapping ensures that there is an alignment with the start address of a logical block with the starting address of the first block of each segment (e.g., block A and block 0, block D and block 4). As shown, a segment size of four physical sectors consequently does not produce a last-address alignment between any logical block and physical block. Accordingly, several physical addresses are unusable, as indicated by portion 82. Notwithstanding, the loss of address space may be an acceptable tradeoff in order to benefit from improved write performance (e.g., not having to pre-read sector-edges). Other segment sizes—again, with reference to 520-byte logical sectors and 512-byte physical sectors—also result in unusable physical addresses. For example, segment sizes of 8, 16, and 32 logical blocks also have a degree of lost address space. No address loss occurs when the segment size is an integer multiple of 64 (520-byte) logical blocks (i.e., 65 (512-byte) physical blocks). Table 1 below compares exemplary segment sizes with the percentage of unused storage capacity:

TABLE 1

| Segment Size (in 520-byte blocks/512-byte blocks) | Approx. Percentage of Unusable Address Space |
| --- | --- |
| 64/65 | 0% |
| 32/33 | 1.5% |
| 16/17 | 4.4% |
| 8/9 | 9.7% |

Figure 6:
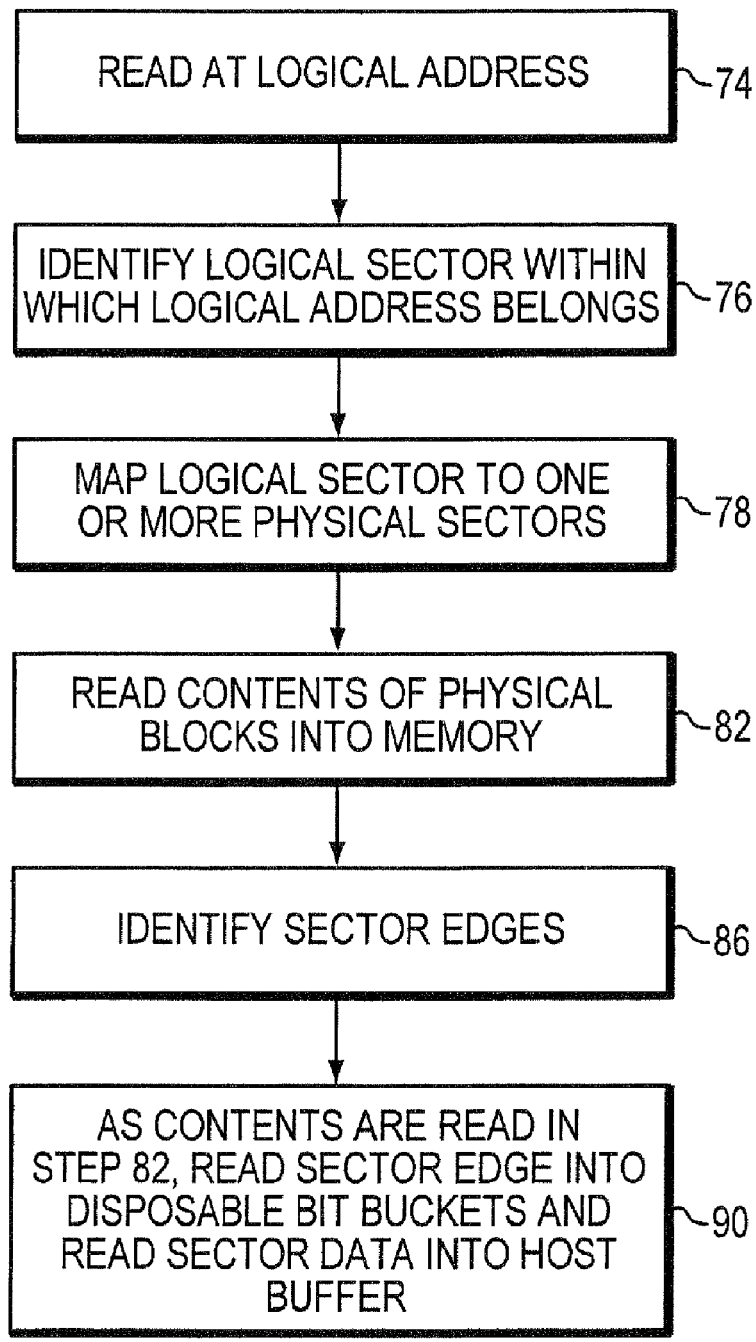
FIG. 6 is a flow diagram of an embodiment of a process for reading data from a physical disk in response to a read request.

FIG. 6 shows an embodiment of a process 70 for reading data from physical sectors of the disks 26 including sector edges in accordance with the technique. At step 74, the application program 30 issues a read request for data at a logical address. This logical address falls within a particular logical sector (step 76). The logical drive logic 38 maps (step 78) the logical sector to one or more physical sectors of a given disk. If logical sectors are larger in bytes than physical sectors, then the mapping identifies at least two physical sectors. If logical sectors are smaller than physical sectors, then the mapping identifies one or, at most, two physical sectors.

Data blocks are read (step 82) from each identified physical block. At step 86, the I/O controller 18 identifies each sector edge resulting from the logical-to-physical sector mapping. An identified sector edge can be a leading sector edge, trailing sector edge, or both, depending upon the referenced logical sector and the particular mapping of that logical sector to the physical sectors. In accordance with the technique, as the identified physical blocks are read in step 82, the I/O controller 18 reads (step 90) each identified sector edge into disposable bit buckets and reads sector data into a host buffer.

Figure 6A:
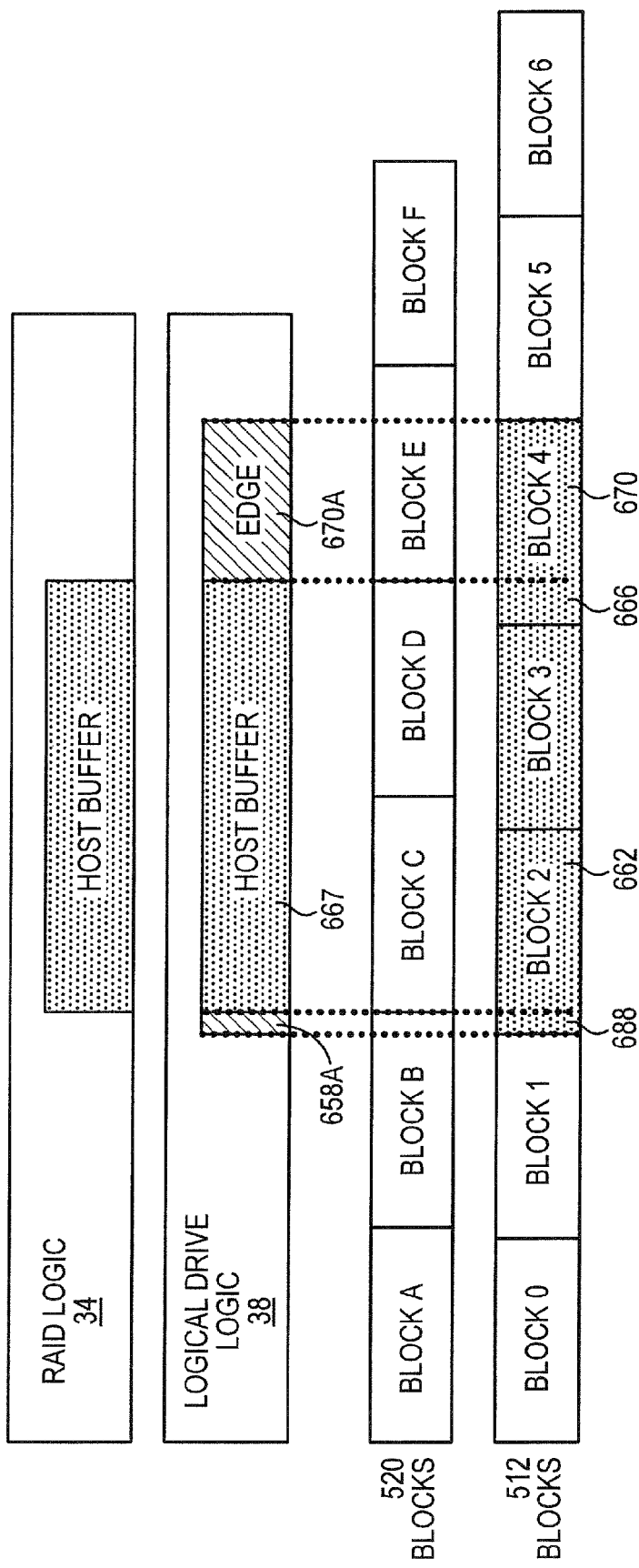
FIG. 6A is a diagram illustrating an exemplary partial mapping of logical sectors to physical sectors in connection with the process of FIG. 6.

With reference also to FIG. 6A, the read operation is illustrated by example. Consider that the application program issues a read request for data at logical blocks C and D. Mapping logical block B to physical blocks 2-4 identifies a leading sector edge 688 from physical block 2 and a trailing sector edge 670 from physical block 4. The I/O controller 18 reads the leading sector edge 688 and the trailing sector edge 670 into bit buckets 658A, 670A respectively and reads sector data from portion 662 of physical block 2, from all of physical block 3, and from portion 666 of physical block 4 into host buffer 667, and such sector data is returned to the application program 30 from the host buffer to satisfy the read request.

Figure 7:
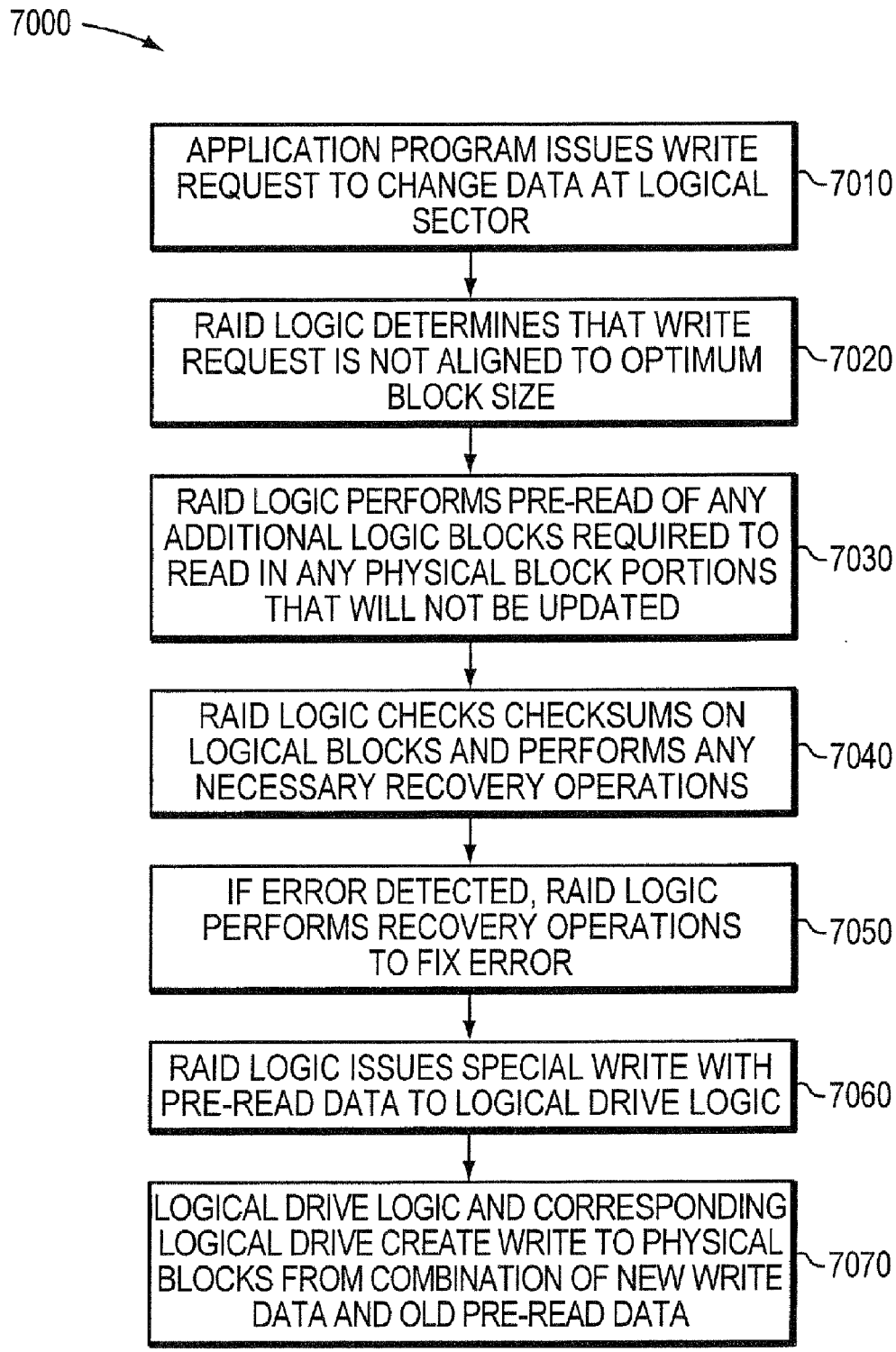
FIG. 7 is a flow diagram of an embodiment of a process for writing data to a physical disk in response to a write request.

FIG. 7 shows an embodiment of a process 7000 for writing data to physical sectors of disks 26 using the pre-read buffer 33 of the technique. At step 7010, the application program 30 issues a write request to change data at a logical sector. RAID logic 34 determines that the write request is not aligned to an optimum block size (step 7020). Optimum block size is the size of I/O in bytes to align requests to in order to get edgeless I/Os (I/Os that are not aligned to this value need to read edges), and is the lowest common multiple (LCM) of an exported block size and an imported block size. Thus for example, if the imported block size is 512 and the exported block size is 520, the optimum block size is 64×520=65× 512=33,280.

RAID logic 34 performs a pre-read of any additional logic blocks required to read in any physical block portions that will not be updated (step 7030). RAID logic 34 checks the checksums on the logical blocks and performs any necessary recovery operations (step 7040). This allows RAID logic 34 to detect any corruption in any partial logical blocks that will be written and helps ensure that such partial logical block or blocks are updated properly. If an error is detected RAID logic 34 performs the recovery operations to fix the error (step 7050). RAID logic 34 issues a special write with pre-read data to logical drive logic 38 (step 7060). Logic 38 and corresponding logical drive 26L create the write to the physical blocks from the combination of new write data and old pre-read data (step 7070).

Figure 7A:
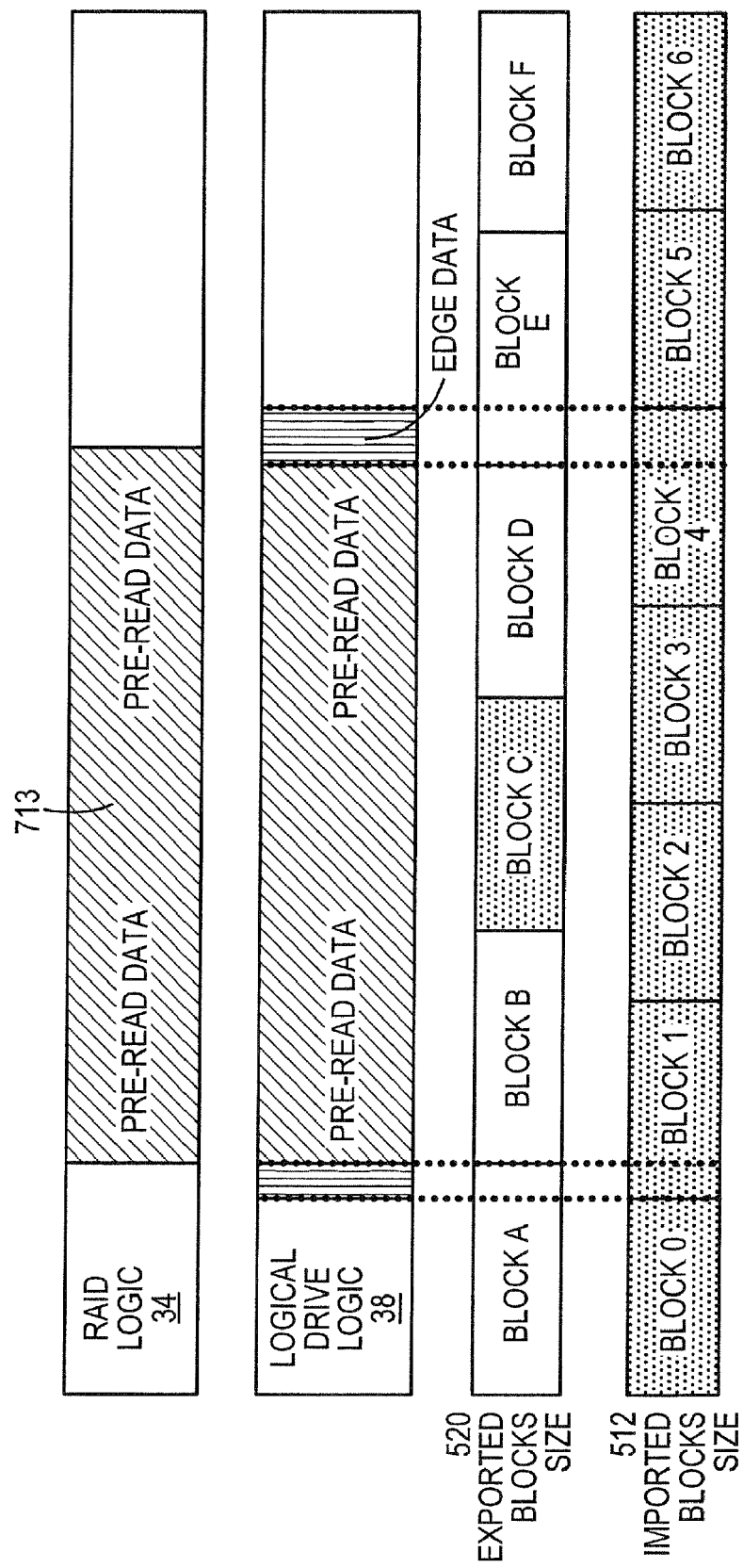
FIGS. 7A-7B are diagrams illustrating an exemplary partial mapping of logical sectors to physical sectors in connection with the process of FIG. 7.
Figure 7B:
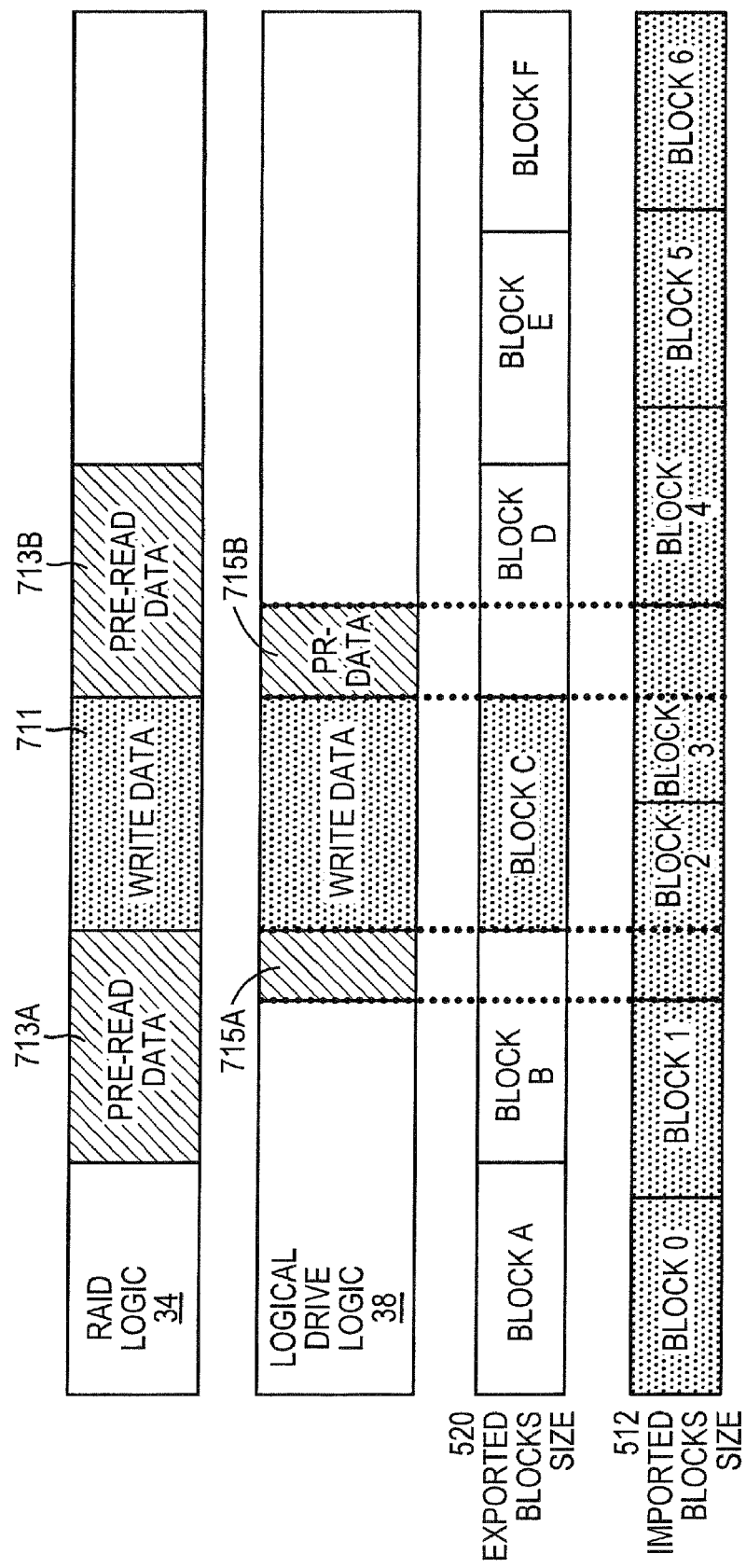

For example, consider a write request to the logical block C of FIG. 7A. RAID logic 34 pre-reads blocks B through D as pre-read data 713. RAID logic 34 then checks the checksum on these blocks B through D before submitting a write operation for block C along with the pre-read data. With reference now to FIG. 7B, RAID logic 34 issues a "write with pre-read" operation which has two pieces of data associated: (1) new write data 711 from the host for block C and (2) remaining pre-read data 713A, 713B from step 7030 above. Logical drive logic 38 receives such write operation with the pre-read data for blocks B through D, and the new write data. Logical drive logic 38 combines this data to form a write of physical blocks 2 and 3. The combination is three separate buffer descriptions that are used for such write of blocks 2 and 3: a buffer for data 11 and buffers for edges 715A, 715B corresponding to pre-read data 713A, 713B.

The read-modify-write process of a RAID-5 implementation suits well the process of pre-reading of sector edges. Because a RAID-5 write operation pre-reads data and parity from a disk in order to recalculate parity before the write to disk occurs, this pre-read can also serve to obtain sector edges. Thus, embodiments that combine a RAID-5 implementation with pre-read buffers such as buffer 33 can absorb the performance penalty associated with pre-reading during the logical sector-to-physical sector conversion. Further, employing a segment size that achieves no address loss, e.g., sixty-four 520-byte/sixty-five 512-byte segments, can optimize a design of the data processing system 10 based on cost and storage capacity.

While the invention has been shown and described with reference to specific preferred embodiments, it should be understood by those skilled in the art that various changes in form and detail may be made therein without departing from the spirit and scope of the invention as defined by the following claims. For instance, the principles of handling sector edges as described herein apply generally to any software that interacts with physical storage using a differently sized sector format than that of the physical storage, and not just specifically between the logical sectors as specified by the I/O controller and the physical sectors of the disk.

What is claimed is:

1. A method for use in handling sector edges, the method comprising:
    handling input/output (I/O) requests to a storage device, wherein the I/O requests use a different sector size format than that of the storage device;
    receiving an I/O request for a write operation at a logical address of a virtual device, the write operation specifying new data to be written to the virtual device;
    determining that the I/O request for the write operation is not aligned to an optimum block size;
    determining a logical sector associated with the logical address;
    mapping the logical sector to one or more physical sectors of the storage device;
    performing a pre-read of the determined logical sector and logical sectors in any portion of the one or more physical sectors that will not be updated;
    checking the consistency of the pre-read data at a RAID level; and
    issuing a write from the RAID level to a different level combining the pre-read data and new data.

2. The method of claim 1, wherein the one or more physical sectors in the storage device contains portions of data from different logical sectors.

3. The method of claim 1, wherein a RAID level has knowledge of the storage device's sector size format and can fix errors found in pre-read data for the I/O request.

4. The method of claim 1, wherein the write operation comprises a RAID-5 write operation.

5. A system for use in handling sector edges, the system comprising:
    first logic handling input/output (I/O) requests to a storage device, wherein the I/O requests use a different sector size format than that of the storage device;
    second logic receiving an I/O request for a write operation at a logical address of a virtual device, the write operation specifying new data to be written to the virtual device;
    third logic determining that the I/O request for the write operation is not aligned to an optimum block size;
    fourth logic determining a logical sector associated with the logical address;
    fifth logic mapping the logical sector to one or more physical sectors of the storage device;
    sixth logic performing a pre-read of the determined logical sector and logical sectors in any portion of the one or more physical sectors that will not be updated;
    seventh logic checking the consistency of the pre-read data at a RAID level; and
    eighth logic issuing a write from the RAID level to a different level combining the pre-read data and new data.

6. The system of claim 5, wherein the one or more physical sectors in the storage device contains portions of data from different logical sectors.

7. The system of claim 5, wherein a RAID level has knowledge of the storage device's sector size format and can fix errors found in pre-read data for the I/O request.

8. The system of claim 5, wherein the write operation comprises a RAID-5 write operation.

* * * * *